United States Patent
Im et al.

(10) Patent No.: US 11,349,739 B2
(45) Date of Patent: May 31, 2022

(54) METHOD AND APPARATUS FOR SPLITTING DATA IN MULTI-CONNECTIVITY

(71) Applicant: SAMSUNG ELECTRONICS CO., LTD., Suwon-si (KR)

(72) Inventors: Hee-su Im, Hwaseong-si (KR); Byung-seung Kim, Seongnam-si (KR); Eun-jun Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 16/445,813

(22) Filed: Jun. 19, 2019

(65) Prior Publication Data

US 2020/0120009 A1    Apr. 16, 2020

(30) Foreign Application Priority Data

Oct. 16, 2018  (KR) .................. 10-2018-0123273

(51) Int. Cl.
*H04L 43/0864* (2022.01)
*H04W 24/08* (2009.01)
*H04W 84/04* (2009.01)
*H04W 88/06* (2009.01)

(52) U.S. Cl.
CPC ......... *H04L 43/0864* (2013.01); *H04W 24/08* (2013.01); *H04W 84/042* (2013.01); *H04W 88/06* (2013.01)

(58) Field of Classification Search
CPC   H04L 43/0864; H04W 24/08; H04W 84/042; H04W 88/08
See application file for complete search history.

(56) References Cited

U.S. PATENT DOCUMENTS

| 9,572,185 | B2 | 2/2017 | Sivanesan et al. |
| 2005/0157696 | A1* | 7/2005 | Yamamoto ............ H04L 1/0019 370/349 |
| 2011/0202641 | A1* | 8/2011 | Kahn ..................... H04L 67/322 709/221 |

(Continued)

FOREIGN PATENT DOCUMENTS

| JP | 4924285 B2 | 4/2012 |
| KR | 10-1425300 B1 | 7/2014 |

(Continued)

OTHER PUBLICATIONS

"3rd Generation Partnership Project; Technical Specification Group Radio Access Network; NR; Packet Data Convergence Protocol (PDCP) specification (Release 15)", 3GPP TS 38.323 V15.2.0 (Jun. 2018), Telecommunications Technology Association, 27 pages.

(Continued)

*Primary Examiner* — Walter J Divito
*Assistant Examiner* — Anthony Luo
(74) *Attorney, Agent, or Firm* — Sughrue Mion, PLLC

(57) ABSTRACT

A method for multi-connectivity between a plurality of base stations and user equipment includes estimating, at the user equipment, a first round trip time (RTT) taken in transmitting first data to a first base station, estimating, at the user equipment, a second RTT taken in transmitting second data to a second base station, and determining a size of the first data which is to be transmitted to the first base station, based on the first RTT and the second RTT.

16 Claims, 12 Drawing Sheets

(56) References Cited

U.S. PATENT DOCUMENTS

| | | | |
|---|---|---|---|
| 2014/0293899 A1* | 10/2014 | Ko | H04L 1/0026 |
| | | | 370/329 |
| 2015/0033084 A1* | 1/2015 | Sasturkar | G06F 16/24578 |
| | | | 714/46 |
| 2016/0183290 A1 | 6/2016 | Ko et al. | |
| 2016/0205586 A1* | 7/2016 | Kim | H04W 28/06 |
| | | | 370/230 |
| 2016/0226708 A1* | 8/2016 | Maheshwari | H04L 67/10 |
| 2018/0091278 A1* | 3/2018 | Kanamarlapudi | H04L 1/1854 |
| 2019/0007946 A1* | 1/2019 | Yerramalli | H04W 76/27 |
| 2019/0159147 A1* | 5/2019 | Ryu | H04W 56/00 |
| 2019/0190806 A1* | 6/2019 | Bhushan | H04W 72/0406 |
| 2020/0099561 A1* | 3/2020 | Lee | G01S 11/02 |
| 2020/0112867 A1* | 4/2020 | Opshaug | G01S 5/02 |
| 2020/0177318 A1* | 6/2020 | Belleschi | H04W 76/28 |

FOREIGN PATENT DOCUMENTS

| | | |
|---|---|---|
| KR | 10-2015-0016473 A | 2/2015 |
| KR | 10-1598621 B1 | 3/2016 |
| KR | 10-2017-0050024 A | 5/2017 |
| KR | 10-2017-0142513 A | 12/2017 |
| KR | 10-2018-0081436 A | 7/2018 |
| WO | 2015/199411 A1 | 12/2015 |

OTHER PUBLICATIONS

Frank Kelly et al., "Stability of End-to-End Algorithms for Joint Routing and Rate Control", Computer Communication Review, vol. 35, No. 2, ACM SIGCOMM, Apr. 2005, pp. 5-12.

\* cited by examiner

METHOD AND APPARATUS FOR SPLITTING DATA IN MULTI-CONNECTIVITY

CROSS-REFERENCE TO RELATED APPLICATION

This application claims priority to Korean Patent Application No. 10-2018-0123273, filed on Oct. 16, 2018, in the Korean Intellectual Property Office, the disclosure of which is incorporated herein in its entirety by reference.

BACKGROUND

The inventive concept relates to wireless communication, and more particularly, to a method and an apparatus for splitting data in multi-connectivity.

In wireless communication between a user equipment and a base station, various techniques may be used to transmit a larger amount of data at a higher speed. For example, multi-connectivity may denote a process where one user equipment communicates with two or more base stations. In multi-connectivity, data may be transmitted and/or received through a plurality of channels between user equipment and two or more base stations, and thus, data throughput may increase and communication quality may be prevented from being degraded due to a poor quality channel. In order to increase the efficiency of multi-connectivity, it is desirable to efficiently distribute transmission data to a plurality of channels.

SUMMARY

The inventive concept provides a method and an apparatus for efficiently splitting data in multi-connectivity.

According to an aspect of the inventive concept, there is provided a method for multi-connectivity between a plurality of base stations and user equipment, the method including estimating, at the user equipment, a first round trip time (RTT) taken in transmitting first data to a first base station, estimating, at the user equipment, a second RTT taken in transmitting second data to a second base station, and determining, at the user equipment, a size of the first data which is to be transmitted to the first base station, based on the first RTT and the second RTT.

According to another aspect of the inventive concept, there is provided a method for multi-connectivity between a plurality of base stations and user equipment, the method including estimating, at a first base station, a first RTT taken in transmitting first data from the first base station to the user equipment, obtaining, at the first base station, a second RTT taken in transmitting second data from a second base station to the user equipment, and determining, at the first base station, a size of the first data which is to be transmitted from the first base station to the user equipment, based on the first RTT and the second RTT.

According to another aspect of the inventive concept, there is provided a method for multi-connectivity between a plurality of base stations and user equipment, the method including estimating a plurality of round trip times (RTTs) taken in transmitting data through a plurality of channels between the plurality of base stations and the user equipment, obtaining respective channel bandwidths of the plurality of channels, and determining sizes of pieces of split data to be transmitted through the plurality of channels, based on the plurality of RTTs and the channel bandwidths.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
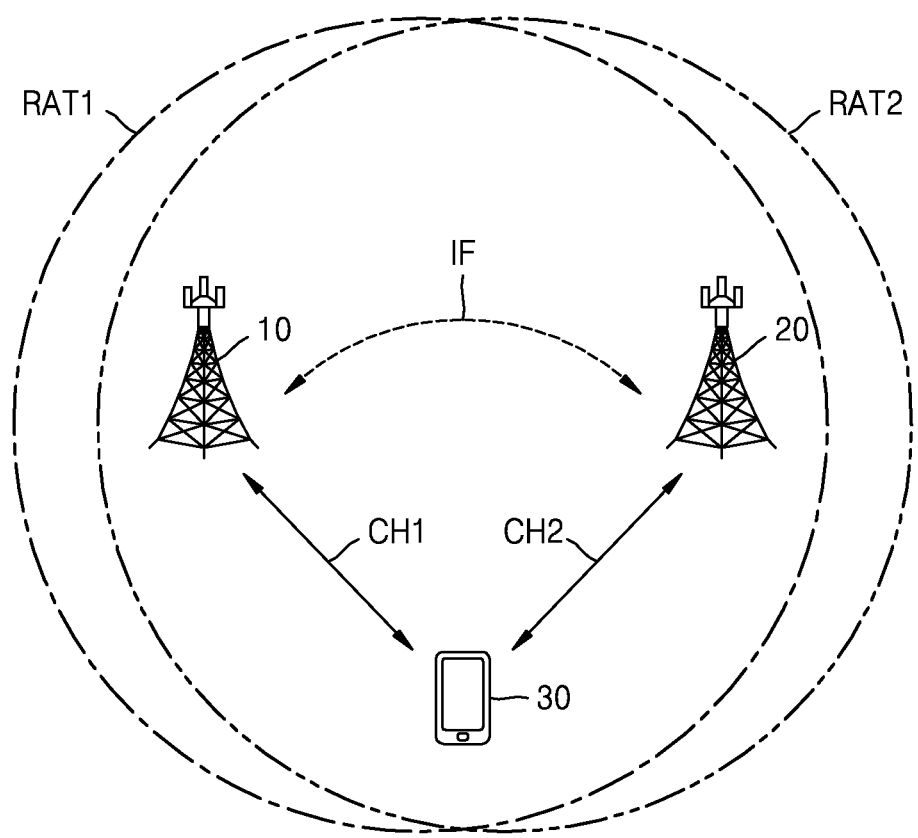
FIG. 1 is a diagram illustrating multi-connectivity according to an exemplary embodiment.

FIG. 1 is a diagram illustrating multi-connectivity according to an exemplary embodiment. In detail, FIG. 1 is a diagram illustrating a plurality of wireless communication systems including a first wireless communication system RAT1 and a second wireless communication system RAT2 each including user equipment (UE) 30 and a plurality of base stations including a first base station 10 and a second base station 20.

In a non-limiting embodiment, each of the first and second wireless communication systems RAT1 and RAT2 may be a $5^{th}$ generation (5G) system, a 5G new radio (5G NR) system, a long term evolution (LTE) system, a code division multiple access (CDMA) system, a global system for mobile communications (GSM) system, a wireless local area network (WLAN) system, or another arbitrary wireless communication system. Herein, a wireless communication system may be referred to as radio access technology (RAT).

The first and second base stations 10 and 20 may communicate with the UE 30, based on multi-connectivity. For example, as illustrated in FIG. 1, the UE 30 and the first base station 10 may establish a first channel CH1 therebetween according to the first wireless communication system RAT1 and may communicate with each other through the first channel CH1. The UE 30 and the second base station 20 may establish a second channel CH2 therebetween according to the second wireless communication system RAT2 and may communicate with each other through the second channel CH2. In some embodiments, the first wireless communication system RAT1 may be the same as the second wireless communication system RAT2. In some other embodiments, the first wireless communication system RAT1 may differ from the second wireless communication system RAT2. Hereinafter, in exemplary embodiments, an example where the first wireless communication system RAT1 is a 5G NR system (i.e., the first base station 10 is a 5G NR base station) and the second wireless communication system RAT2 is an LTE system (i.e., the second base station 20 is an LTE base station) will be mainly described. However, it should be understood that exemplary embodiments are not limited thereto.

A base station (for example, the first base station 10 and/or the second base station 20) may denote a fixed station and may communicate with the UE 30 and/or another base station to exchange data and control information. For example, a base station may be referred to as a node B, an evolved node B (eNB), a next generation node B (gNB), a sector, a site, a base transceiver system (BTS), an access point (AP), a relay node, a remote radio head (RRH), a radio unit (RU), or a small cell. Herein, a base station or a cell may be construed as a comprehensive meaning representing a function performed or a certain area covered by a base station controller (BSC) in CDMA, a node B in WCDMA, an eNB in LTE, or a gNB or a sector (a site) in 5G NR, and may cover various coverage areas such as a mega cell, a micro cell, a pico cell, a femto cell, a relay node, an RRH, an RU, and a small cell communication range.

The UE 30 may be a wireless communication device and may be fixed or mobile. Also, the UE 30 may denote various devices which communicate with a base station to transmit or receive data and/or control information. For example, the UE 30 may be referred to as terminal equipment, a mobile station (MS), a user terminal (UT), a subscriber station (SS), a wireless device, or a handheld device. Also, the UE 30 may support multi-connectivity, and thus, as illustrated in FIG. 1, the UE 30 may be connected to two or more base stations, for example, the first and second base stations 10 and 20. Particularly, as illustrated in FIG. 1, one UE 30 being connected to two base stations, for example, the first and second base stations 10 and 20, may be referred to as dual connectivity. Hereinafter, in exemplary embodiments, dual connectivity will be mainly described, but it should be understood that exemplary embodiments are applied to multi-connectivity where the UE 30 communicates with three or more base stations.

A wireless communication network between the first and second base stations 10 and 20 and the UE 30 may share available network resources, and thus, may support a plurality of users. For example, information may be transferred over the wireless communication network by using various multiple access schemes such as CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA. The first base station 10 may communicate with the second base station 20 through an interface IF. In some embodiments, the first base station 10 may access the second base station 20 through an X2 interface. In some other embodiments, as described below with reference to FIG. 12, the first base station 10 may access the second base station 20 over a core network.

In multi-connectivity, data may be split and transmitted, and split portions (e.g., first and second data) of the data may be transmitted through the first channel CH1 and the second channel CH2, respectively. For example, in a downlink, the first and second base stations 10 and 20 may respectively transmit the first and second data, obtained by splitting data which is to be transmitted to the UE 30, to the UE 30 through the first and second channels CH1 and CH2. Also, in an uplink, the UE 30 may split data, which is to be transmitted, into the first and second data and may respectively transmit the first and second data to the first and second base stations 10 and 20 through the first and second channels CH1 and CH2. Hereinafter, according to exemplary embodiments, as described below with reference to the drawings, the UE 30 and the first and second base stations 10 and 20 may efficiently split data, based on a state of each of the first and second channels CH1 and CH2. Accordingly, delay due to reordering of data may be reduced, and improved quality of experience (QoE) may be provided to a user of the UE 30.

Figure 2:
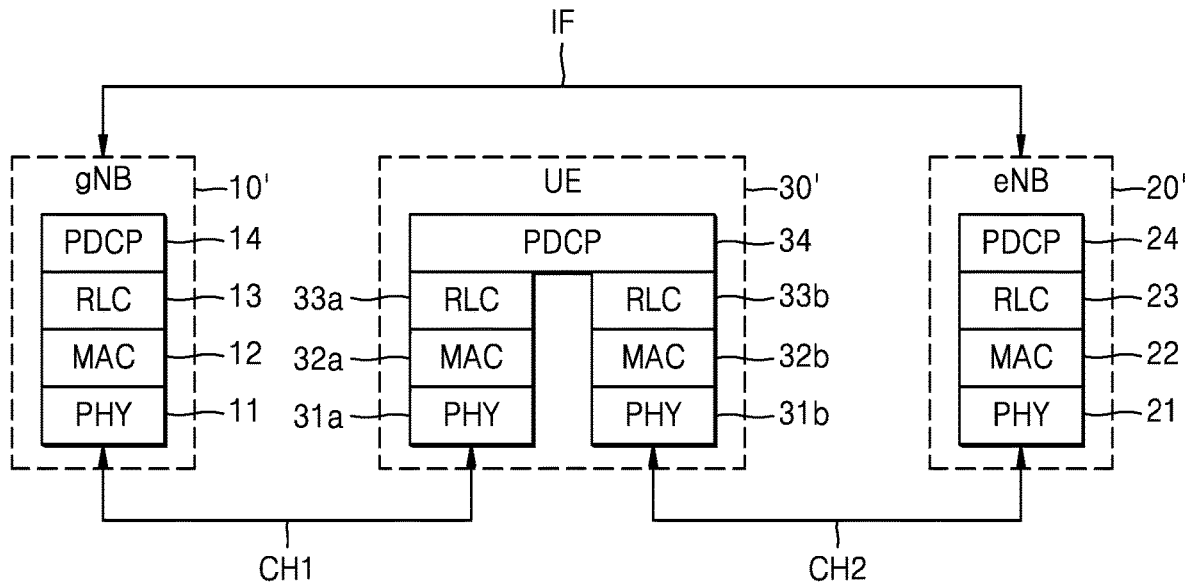
FIG. 2 is a diagram illustrating a structure of a wireless protocol in multi-connectivity of FIG. 1, according to an exemplary embodiment.

FIG. 2 is a diagram illustrating a structure of a wireless protocol in multi-connectivity of FIG. 1, according to an exemplary embodiment.

As described above with reference to FIG. 1, UE 30' may access a first base station 10' and a second base station 20'. In FIG. 2, it may be assumed that the first base station 10' is a base station (for example, gNB) of a 5G NR system, and the base station 20' is a base station (for example, eNB) of an LTE system. As illustrated in FIG. 2, the UE 30' (or a packet data convergence protocol (PDCP) of the UE 30') may support a wireless protocol of the first wireless communication system RAT1 (for example, the 5G NR system) and a wireless protocol of the second wireless communication system RAT2 (for example, the LTE system). Hereinafter, FIG. 2 will be described with reference to FIG. 1.

Referring to FIG. 2, in each of the first base station 10' and the UE 30', the wireless protocol of the first wireless communication system RAT1 may include physical (PHY) layers 11 and 31a, medium access controls (MACs) 12 and 32a, radio link controls (RLCs) 13 and 33a, and PDCPs 14 and 34. Each of the PHY layers 11 and 31a, the MACs 12 and 32a, the RLCs 13 and 33a, and the PDCPs 14 and 34 may perform unique functions thereof, based on prescription by the first wireless communication system RAT1. For example, the PHY layers 11 and 31a may encode and modulate data of the MACs 12 and 32a, generate an OFDM symbol to transmit the generated OFDM symbol to the first channel CH1, demodulate and decode an OFDM symbol received through the first channel CH1, and transfer data to the MAC 12 and 32a. The MACs 12 and 32a may perform functions including hybrid automatic repeat request (HARQ) retransmission, the RLC 13 and 33a may perform functions including automatic repeat request (ARQ), and the PDCPs 14 and 34 may perform functions including reordering.

In each of the second base station 20' and the UE 30', the wireless protocol of the second wireless communication system RAT2 may include PHY layers 21 and 31b, MACs 22 and 32b, RLCs 23 and 33b, and PDCPs 24 and 34. Each of the PHY layers 21 and 31b, the MACs 22 and 32b, the RLCs 23 and 33b, and the PDCPs 24 and 34 may perform unique functions thereof, based on prescription by the second wireless communication system RAT2. For example, the PHY layers 21 and 31b may encode and modulate data of the MACs 22 and 32b, generate an OFDM symbol to transmit the generated OFDM symbol to the second channel CH2, demodulate and decode an OFDM symbol received through the second channel CH2, and transfer data to the MACs 22 and 32b. The MACs 22 and 32b may perform functions including HARQ retransmission, the RLCs 23 and 33b may perform functions including ARQ, and the PDCPs 24 and 34 may perform functions including reordering.

The PDCP 34 may include a split bearer in dual connectivity. The split bearer may distribute a data packet to a plurality of different RLC entities in one PDCP to transmit data through a plurality of channels, and thus, may denote a data radio bearer (DRB) for enhancing a data transmission rate. For example, in the uplink, the PDCP 34 may process data packets (or PDCP service data units (SDUs)) into PDCP protocol data units (PDUs) and may transfer the PDCP PDUs to two RLC entities 33a and 33b. Here, when the PDCP PDUs transferred to the two RLC entities 33a and 33b are not appropriately distributed, namely, when a size of split data is not appropriately determined, delay due to reordering may increase in the PDCP 34. When the delay due to the reordering increases, delay may occur in an upper layer (for example, an application layer (for example, 35 of FIG. 3)) of the PDCP 34, causing the degradation in user QoE of the UE 30'. Also, a problem similar to the above-described problem may occur in the downlink.

Figure 3:
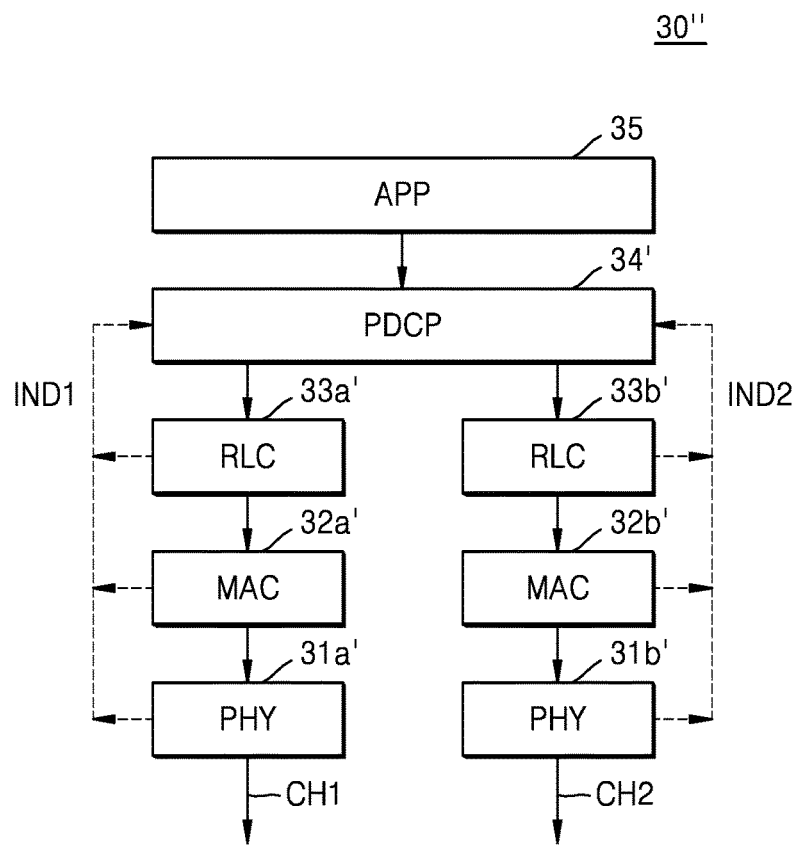
FIG. 3 is a diagram illustrating a structure of a wireless protocol in user equipment according to an exemplary embodiment.

FIG. 3 is a diagram illustrating a structure of a wireless protocol in UE 30" according to an exemplary embodiment. In detail, FIG. 3 illustrates a structure of a wireless protocol in the uplink. Hereinafter, FIG. 3 will be described with reference to FIG. 1, and in describing FIG. 3, the same or similar description to those previously provided with reference to FIG. 2 will be omitted.

Referring to FIG. 3, the wireless protocol may include a first PHY layer 31a', a first MAC 32a', and a first RLC 33a' for the first wireless communication system RAT1 and may include a second PHY layer 31b', a second MAC 32b', and a second RLC 33b' for the second wireless communication system RAT2, and a PDCP 34' may support the first wireless communication system RAT1 and the second wireless communication system RAT2. Also, an application 35 corresponding to an upper layer of the PDCP 34' may provide the PDCP 34' with a data packet which is to be transmitted through the uplink.

The PDCP 34', as described above with reference to FIG. 2, may determine data (e.g., sizes of first data and second data) which is to be transmitted through the first channel CH1 and the second channel CH2 in multi-connectivity, and thus, may split the data packet provided from the application 35 and may respectively provide pieces of split data to the first RLC (or a first RLC entity) 33a' and the second RLC (or a second RLC entity) 33b'. For example, according to the NR PDCP standard (3GPP TS 38.323 V15.2.0, 2018-06) published recently, a means for minimizing PDCP reordering delay caused by a data splitting operation performed by the UE 30" is defined as a capability of the UE 30".

In some embodiments, the PDCP 34' may be provided with a plurality of indicators from lower layers and may distribute data to the first RLC 33a' and the second RLC 33b', based on the plurality of indicators. For example, as illustrated in FIG. 3, the PDCP 34' may be provided with first indicators IND1 from the first PHY layer 31a', the first MAC 32a' and the first RLC 33a' and may be provided with second indicators IND2 from the second PHY layer 31b' the second MAC 32b' and the second RLC 33b'. The PDCP 34' may detect states of the first channel CH1 and the second channel CH2 based on the first indicators IND1 and the second indicators IND2, and may distribute data to the first RLC 33a', and the second RLC 33b' based on the states of the first channel CH1 and the second channel CH2. An exemplary operation of the PDCP 34' will be described below with reference to FIG. 4.

Figure 4:
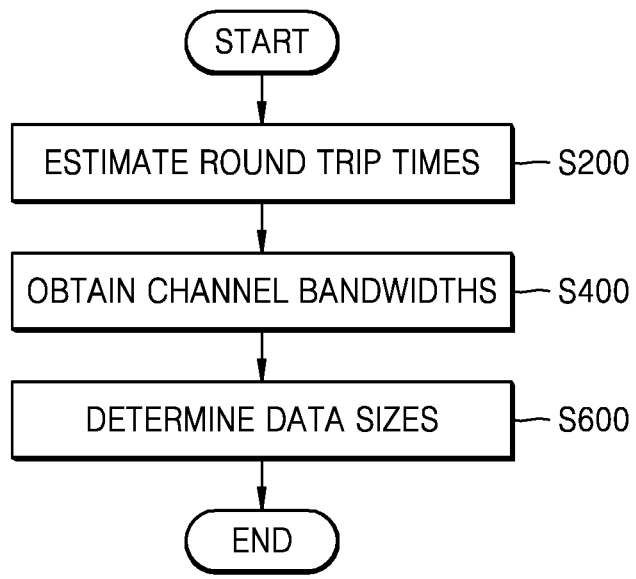
FIG. 4 is a flowchart illustrating a method for multi-connectivity according to an exemplary embodiment.

FIG. 4 is a flowchart illustrating a method for multi-connectivity according to an exemplary embodiment. For example, the method of FIG. 4 may be performed by the PDCP 34' of FIG. 3, and as described below with reference to FIG. 5, may be triggered by various factors. Hereinafter, FIG. 4 will be described with reference to FIGS. 1 and 3.

Referring to FIG. 4, in operation S200, an operation of estimating round trip times may be performed. A round trip time (RTT) may be defined as a time taken for a transmitting side to transmit data to a receiving side and receive a response (for example, an acknowledge response (ACK)) to the transmitted data from the receiving side. A document "Stability of end-to-end algorithms for joint routing and rate control" (F. Kelly and T. Voice, ACM SIGCOMM CCR, 35, 2005) has proposed a method for maximizing network efficiency in a transmission control protocol (TCP), and the proposed method may be expressed as the following Equation (1). A transmitting side may change a congestion window "cwnd" of a corresponding path by $\Delta w_p$ of the following Equation (1):

$$\Delta w_p = \frac{\max_{i \in P}\left(\frac{w_i}{RTT_i^2}\right)}{\sum_{i \in P}\left(\frac{w_i}{RTT_i}\right)^2} \qquad (1)$$

In Equation (1), P may denote a total set of paths formed by a single host, $w_i$ may denote a current transmission window of an $i^{th}$ path, and $RTT_i$ may denote a round trip time of the $i^{th}$ path. In some embodiments, in multi-connectivity, splitting of data may be performed based on a change in a transmission window provided in Equation (1). In the TCP, a round trip time may be determined based on traffic of a network, and thus, the transmitting side may measure, as the round trip time, a difference between a time when data is transmitted and a time when ACK is received. On the other hand, in multi-connectivity, a round trip time may depend on a state of a channel and may be estimated as described below.

In order to apply Equation (1) to multi-connectivity illustrated in FIG. 1, a first round trip time $RTT_1$ and a second round trip time $RTT_2$ respectively corresponding to the first channel CH1 and the second channel CH2 may be estimated. For example, as described above with reference to FIG. 3, the PDCP 34' of the UE 30" may estimate the first round trip time $RTT_1$ based on the first indicators ID1 provided from lower layers, and may estimate the second round trip time $RTT_2$ based on the second indicators ID2 provided from lower layers. An example of operation S200 will be described below with reference to FIG. 6.

In operation S400, an operation of obtaining channel bandwidths may be performed. As illustrated in FIG. 1, in multi-connectivity where the UE 30 communicates with the first and second base stations 10 and 20, the UE 30 and one base station (for example, the first base station 10 or the second base station 20) may be regarded as a 1-hop network, and $w_i$ of Equation (1) may be expressed as a multiplication of a channel bandwidth and a round trip time as in the following Equation (2):

$$w_i = BW_i \times RTT_i \qquad (2)$$

Therefore, in Equation (1), $w_i$ may be replaced with "$BW_i \times RTT_i$", and in operation S400, an operation of obtaining channel bandwidths (i.e., a first channel bandwidth $BW_1$ of the first channel CH1 and a second channel bandwidth $BW_2$ of the second channel CH2) may be performed. For example, the first PHY layer 31a' and the second PHY layer 31b' may respectively measure the first channel bandwidth $BW_1$ and the second channel bandwidth $BW_2$, the PDCP 34' may obtain the first channel bandwidth $BW_1$, based on an indicator provided from the first PHY layer 31a' among the first indicators IND1 and may obtain the second channel bandwidth $BW_2$, based on an indicator provided from the second PHY layer 31b' among the second indicators IND2.

In operation S600, an operation of determining sizes of pieces of split data (e.g., first and second data) may be performed. When the first channel bandwidth $BW_1$ and the second channel bandwidth $BW_2$ respectively correspond to channel bandwidths of the first channel CH1 and the second channel CH2, Equation (1) may be expressed as the following Equation (3) in multi-connectivity illustrated in FIG. 1:

$$\Delta w = \frac{\max\left(\frac{BW_1}{RTT_1}, \frac{BW_2}{RTT_2}\right)}{(BW_1 + BW_2)^2} \quad (3)$$

Moreover, in multi-connectivity based on M (where M is an integer greater than one) number of channels, Equation (1) may be expressed as the following Equation (4):

$$\Delta w = \frac{\max_{1 \le i \le M} \frac{BW_i}{RTT_i}}{\left(\sum_{i=1}^{M} BW_i\right)^2} \quad (4)$$

The first round trip time $RTT_1$ and the second round trip time $RTT_2$ may be estimated in operation S200, and the first channel bandwidth $BW_1$ and the second channel bandwidth $BW_2$ may be obtained in operation S400. Therefore, in operation S600, the PDCP 34' may calculate a variation (i.e., $\Delta w$) of data size, based on Equation (3) and may reflect the variation $\Delta w$ in splitting the data packet to be transmitted. An example of operation S600 will be described below with reference to FIG. 8.

Figure 5:
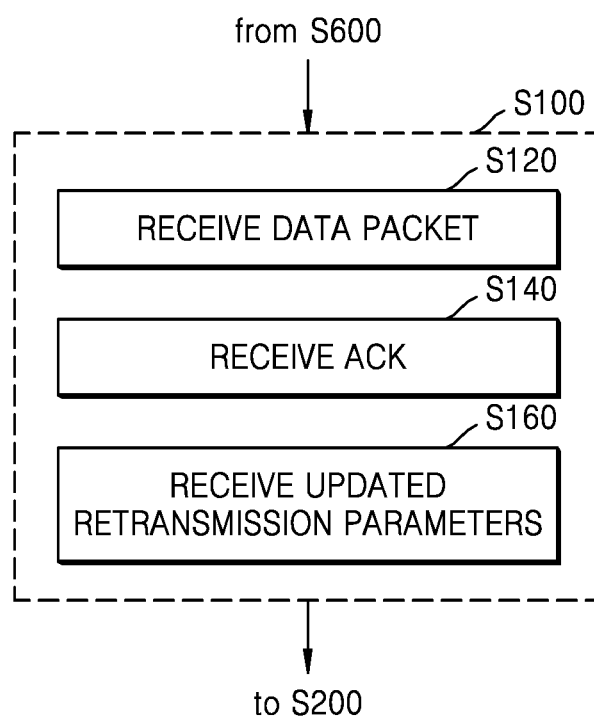
FIG. 5 is a flowchart illustrating a method for multi-connectivity according to an exemplary embodiment.

FIG. 5 is a flowchart illustrating a method for multi-connectivity according to an exemplary embodiment. In detail, performing of the method for multi-connectivity described above with reference to FIG. 4 may be triggered in operation S100 of FIG. 5, and after operation S100 is performed, operation S200 of FIG. 4 may be subsequently performed. Also, after operation S600 of FIG. 4 is performed, operation S100 of FIG. 5 may be performed. As illustrated in FIG. 5, operation S100 may include operations S120, S140, and S160. In some embodiments, when at least one of operations S120, S140, and S160 of operation S100 is performed, the method may proceed to operation S200. In some other embodiments, operation S100 may include only some of operations S120, S140, and S160. Hereinafter, FIG. 5 will be described with reference to FIG. 3.

In operation S120, an operation of receiving a data packet may be performed. For example, when the data packet is received from the application 35 corresponding to the upper layer, the PDCP 34' may trigger the method of FIG. 4. The data packet received from the application 35 may be data which is to be transmitted by the application 35 through wireless communication and may be referred to as a PDCP SDU, and in some embodiments, the data packet may include a header and a payload.

In operation S140, an operation of receiving ACK may be performed. For example, when the ACK corresponding to an RLC PDU in an RLC acknowledge mode (AM) is received, the PDCP 34' may trigger the method of FIG. 4. In some embodiments, when a predefined number of ACKs are received, the PDCP 34' may trigger the method of FIG. 4. Also, in some embodiments, as described below with reference to Equation (8), the PDCP 34' may trigger the method of FIG. 4, based on a predefined period or another factor, and in this case, the number of received ACKs may be used.

In operation S160, an operation of receiving updated retransmission parameters may be performed. As described below with reference to FIG. 6, round trip times may be estimated based on retransmission in operation S200 of FIG. 4. A wireless communication system may prescribe values of retransmission parameters, some wireless communication systems (for example, the 5G NR system) may prescribe the values of the retransmission parameters to vary, and a base station may update the retransmission parameters, based on a channel state. When the values of the retransmission parameters vary, the estimated round trip times may vary, and thus, when updated retransmission parameters are received from the base station, the PDCP 34' may trigger the method of FIG. 4.

Figure 6:
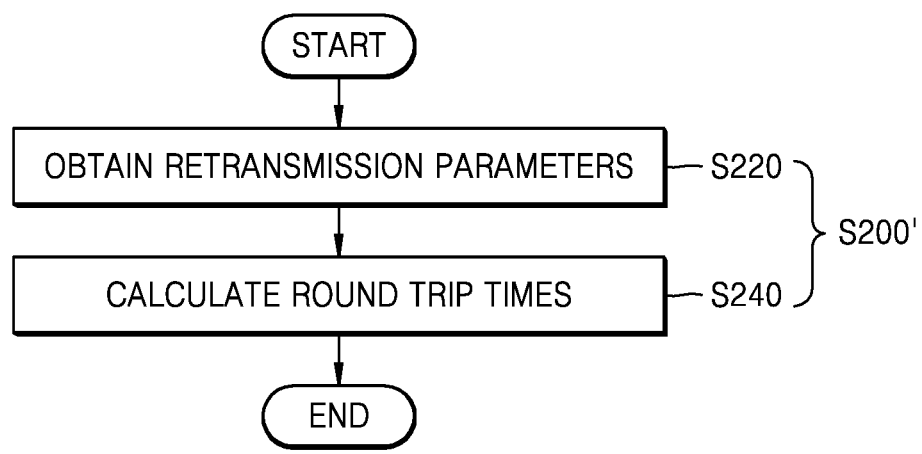
FIG. 6 is a flowchart illustrating operation S200 of FIG. 4, according to an exemplary embodiment.

FIG. 6 is a flowchart illustrating operation S200 of FIG. 4, according to an exemplary embodiment. As described above with reference to FIG. 4, an operation of estimating round trip times may be performed in operation S200' of FIG. 6. In detail, one round trip time corresponding to one channel may be estimated in operation S200' of FIG. 6, and operation S200' of FIG. 6 may be performed sequentially or in parallel a plurality of times, based on a plurality of channels. As illustrated in FIG. 6, operation S200' may include operation S220 and operation S240. Hereinafter, FIG. 6 will be described with reference to FIGS. 1 and 3, and an example which estimates the first round trip time $RTT_1$ corresponding to the first channel CH1 will be described based on the assumption that the UE 30 of FIG. 1 is the UE 30'' of FIG. 3.

In operation S220, an operation of obtaining retransmission parameters may be performed. For example, the PDCP 34' may be provided with the first indicators IND1, including first retransmission parameters, provided from the first base station 10. In some embodiments, the PDCP 34' may reflect HARQ retransmission in estimating the first round trip time $RTT_1$, and for example, the first retransmission parameters may include a retransmission period $c_1$ and a maximum retransmission number $N_1$. In some other embodiments, the PDCP 34' may reflect RLC retransmission in estimating the first round trip time $RTT_1$, and for example, the first retransmission parameters may include an RLC maximum retransmission number $R_1$.

In operation S240, an operation of calculating a round trip time may be performed. For example, the PDCP 34' may calculate the first round trip time $RTT_1$ used to calculate the variation $\Delta w$ of data size in Equation (3), based on the retransmission parameters which are obtained in operation S220. In some embodiments, the PDCP 34' may calculate a round trip time including HARQ retransmission provided by the first MAC 32a'. In some embodiments, the PDCP 34' may calculate a round trip time further including RLC retransmission provided by the first RLC 33a'. Examples of operation S240 will be described below with reference to FIGS. 7A and 7B.

Figure 7A:
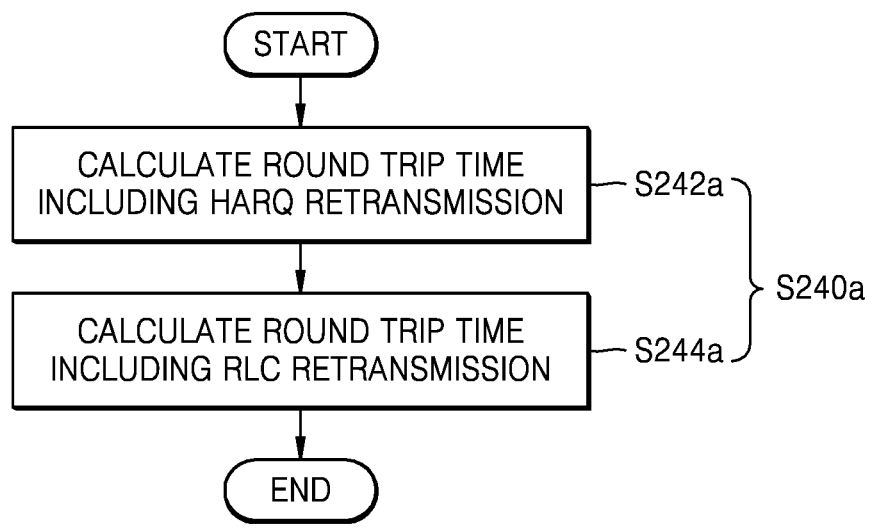
FIGS. 7A and 7B are flowcharts illustrating operation S240 of FIG. 6, according to exemplary embodiments.
Figure 7B:
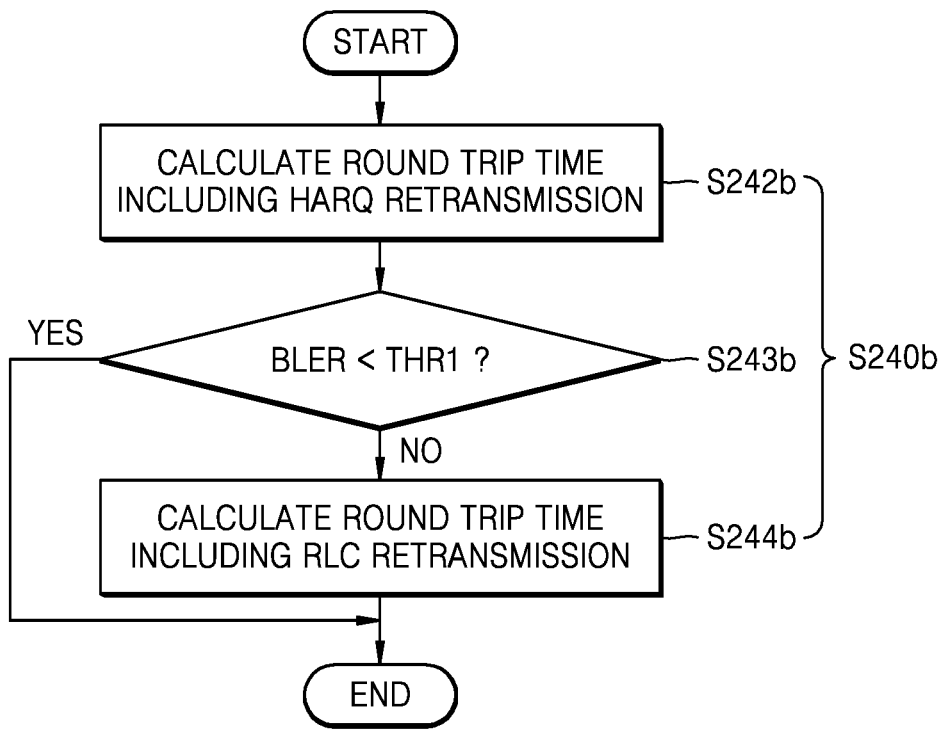

FIGS. 7A and 7B are flowcharts illustrating operation S240 of FIG. 6, according to exemplary embodiments.

An operation of calculating the first round trip time $RTT_1$ as described above with reference to FIG. 6 may be performed in operation S240a of FIG. 7A and S240b of FIG. 7B. Repetitive descriptions will be omitted in describing the embodiments of FIGS. 7A and 7B. FIGS. 7A and 7B will be described with reference to FIGS. 1 and 3, and an example which estimates the first round trip time $RTT_1$ corresponding to the first channel CH1 based on the assumption that the UE 30 of FIG. 1 is the UE 30" of FIG. 3 will be described.

Referring to FIG. 7A, operation S240*a* may include operation S242*a* and operation S244*a*, and an operation of calculating a round trip time including HARQ retransmission may be performed in operation S242*a*. For example, the PDCP 34' may calculate a first round trip time $RTT_{S1}$ including HARQ retransmission by using a block error rate BLER as in the following Equation (5):

$$RTT_{S1}=(1-BLER \times \Sigma_{n=0}^{N1-1} BLER_1^n (p_1+n \times c_1)) \quad (5)$$

In Equation (5), a first block error rate $BLER_1$ may denote a block error rate measured in the first channel CH1. In some embodiments, the PDCP 34' may obtain the first block error rate $BLER_1$ from an indicator provided by the first PHY layer 31*a*' among the first indicators IND1.

First propagation delay $p_1$ may represent propagation delay occurring in the first channel CH1. In some embodiments, the PDCP 34' may obtain the first propagation delay $p_1$ from the first MAC 32*a*'. For example, the first base station 10 may allocate a dedicated random access preamble to the UE 30", and when the UE 30" does not include a wireless resource for first accessing the first base station 10 or for transmitting a signal to the first base station 10, the UE 30" may perform a random access procedure (RACH), based on the random access preamble. The first base station 10 may measure a transmission time of the UE 30" by using a random access preamble (or a sounding reference signal (SRS)), calculate a correction timing value, and inform the UE 30" of the calculated correction timing value. The correction timing value (i.e., a timing advance value) provided from the first base station 10 to the UE 30" may be referred to as a timing advance command (TAC), and the TAC may be processed in an MAC layer. Therefore, the first MAC 32*a*' of the UE 30" may generate the first propagation delay $p_1$, based on the TAC and may provide the PDCP 34' with the first propagation delay $p_1$ as one of the first indicators IND1.

In some embodiments, the first propagation delay $p_1$ may be omitted in calculating the first round trip time $RTT_{S1}$ including HARQ retransmission. For example, in Equation (5), the first propagation delay $p_1$ may have a small value compared to '$n1 \times c1$', and thus, the first round trip time $RTT_{S1}$ including HARQ retransmission may be calculated as in the following Equation (6). In this case, an operation of obtaining the first propagation delay $p_1$ as a first retransmission parameter from the first MAC 32*a*' may be omitted in operation S220 of FIG. 6:

$$RTT_{S1}=(1-BLER \times \Sigma_{n=0}^{N1-1} BLER_1^n (n \times c_1)) \quad (6)$$

In some embodiments, the PDCP 34' may determine the first round trip time $RTT_{S1}$ as the first propagation delay $p_1$ in an RLC unacknowledge mode (UM). For example, when the first block error rate $BLER_1$ is approximately maintained as zero, the RLC UM may be set, and the PDCP 34' may determine the first round trip time $RTT_{S1}$ as the first propagation delay $p_1$. Also, in some other embodiments, the PDCP 34' may reflect the variation $\Delta w$ at every first propagation delay $p_1$ (i.e., first round trip time $RTT_{S1}$).

It should be understood that the second round trip time $RTT_{S2}$ which includes HARQ retransmission and corresponds to the second channel CH2 is similarly calculated based on Equation (5) and/or Equation (6).

In operation S244*a*, an operation of calculating a round trip time including RLC retransmission may be performed. For example, the PDCP 34' may calculate a first round trip time $RTT_{T1}$ including RLC retransmission as in the following Equation (7):

$$RTT_{T1}=RTT_{S1} \times \Sigma_{r=0}^{R1}(BLER_1^{N1})^r \quad (7)$$

In the embodiment of FIG. 7A, the PDCP 34' may use the first round trip time $RTT_{T1}$, calculated based on Equation (7), as the data variation $\Delta w$ of Equation (3). Also, it should be understood that the second round trip time $RTT_{S2}$ which includes HARQ retransmission and corresponds to the second channel CH2 is similarly calculated based on Equation (7).

Referring to FIG. 7B, operation S240*b* may include operation S242*b*, operation S243*b*, and operation S244*b*. In comparison with operation S240*a* of FIG. 7A, operation S240*b* of FIG. 7B may further include operation S243*b*. Similarly to operation S242*a* of FIG. 7A, an operation of calculating a round trip time including HARQ retransmission may be performed in operation S242*b*. Therefore, a first round trip time $RTT_{S1}$ and a second round trip time $RTT_{S2}$ each including HARQ retransmission may be calculated.

In operation S243*b*, an operation of comparing a block error rate BLER with a predefined first threshold value THR1 may be performed. For example, in a process of calculating the first round trip time $RTT_{S1}$, a first block error rate $BLER_1$ may be compared with the predefined first threshold value THR1, and as illustrated in FIG. 7B, when the first block error rate $BLER_1$ is less than the first threshold value THR1, operation S240*b* may end. On the other hand, when the first block error rate $BLER_1$ is equal to or greater than the first threshold value THR1, operation S244*b* may be performed, and an operation of calculating a first round trip time $RTT_{T1}$ including RLC retransmission may be performed in operation S244*b*.

As a result, in the embodiment of FIG. 7B, when the first block error rate $BLER_1$ is less than the first threshold value THR1, the first round trip time $RTT_{S1}$, including HARQ retransmission, of Equation (5) or (6) may be determined as a final first round trip time $RTT_1$. On the other hand, when the first block error rate $BLER_1$ is equal to or greater than the first threshold value THR1, the first round trip time $RTT_{T1}$ including RLC retransmission may be determined as the final first round trip time $RTT_1$. In a state where a block error rate is low, a possibility that RLC retransmission occurs may be low, and thus, in the embodiment of FIG. 7B, operation S244*b* (for example, calculation based on Equation (7)) may be omitted.

Figure 8:
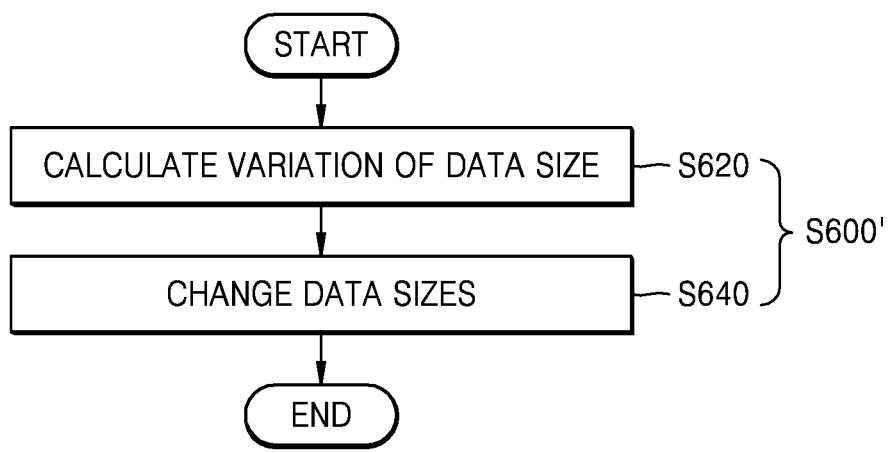
FIG. 8 is a flowchart illustrating operation S600 of FIG. 4, according to an exemplary embodiment.

FIG. 8 is a flowchart illustrating operation S600 of FIG. 4, according to an exemplary embodiment. As described above with reference to FIG. 4, an operation of determining sizes of pieces of split data (for example, first data and second data) may be performed in operation S600' of FIG. 8. As illustrated in FIG. 8, operation S600' may include operation S620 and operation S640. Hereinafter, FIG. 8 will be described with reference to FIGS. 3 and 4.

In operation S620, an operation of calculating a variation of data size may be performed. For example, the PDCP 34' may calculate a variation $\Delta w$ of data size as in Equation (3), based on the round trip times obtained through operation S200 and the channel bandwidths obtained through operation S400. In some embodiments, the variation $\Delta w$ may be identically applied to a plurality of channels.

In some embodiments, when a variation of data size is not calculated each time ACK occurs, a variation $\Delta w_1$ of data size corresponding to the first channel CH1 may be calculated as in the following Equation (8):

$$\Delta w_1 = \frac{\max\left(\frac{BW_1}{RTT_1}, \frac{BW_2}{RTT_2}\right)}{(BW_1 + BW_2)^2} \times N_{ACK1} \quad (8)$$

In Equation (8), $N_{ACK1}$ may denote the number of ACKs received through the first channel CH1 from the first base station 10. For example, the PDCP 34' may calculate the variation $\Delta w_1$ of data size in the RLC AM, based on Equation (8). Similarly, a variation $\Delta w_2$ of data size corresponding to the second channel CH2 may be calculated by using $N_{ACK2}$ which denotes the number of ACKs received through the second channel CH2 from the second base station 20.

In multi-connectivity based on M number of channels, a variation $\Delta w_i$ of data size corresponding to an $i^{th}$ channel CHi may be calculated as in the following Equation (9):

$$\Delta w_i = \frac{\max_{1 \le i \le M} \frac{BW_i}{RTT_i}}{\left(\sum_{i=1}^{M} BW_i\right)^2} \times N_{ACKi} \quad (9)$$

In operation S640, an operation of changing data sizes may be performed. For example, the PDCP 34' may add the variation $\Delta w$, calculated through operation S620, to data sizes set in a plurality of channels to change the data sizes. In some embodiments, when the variation $\Delta w$ is identically applied to the plurality of channels, the same variation $\Delta w$ may be added to the data sizes set in the plurality of channels. For example, retransmission may rarely occur in a channel having a sufficient quality, and thus, even when the variation $\Delta w$ has a negative value, a large amount of data may be transmitted through the channel having a sufficient quality (or channel state) compared to a channel having a lower quality. Also, retransmission may frequently occur in the channel having a poor quality, and thus, even when the variation $\Delta w$ has a positive value, a small amount of data may be transmitted through the channel having a lower quality, compared to the channel having a sufficient quality.

Figure 9A:
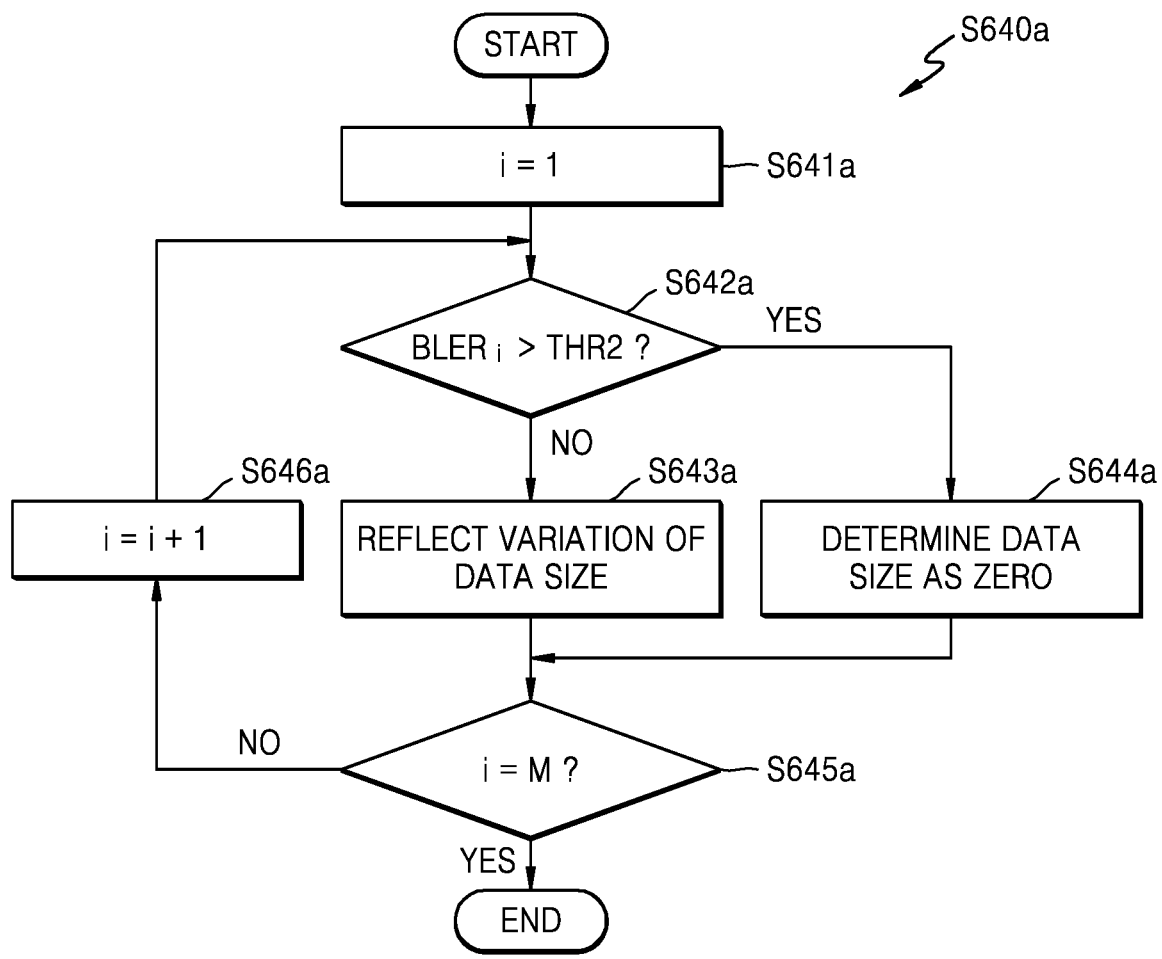
FIGS. 9A and 9B are flowcharts illustrating operation S640 of FIG. 8, according to exemplary embodiments.
Figure 9B:
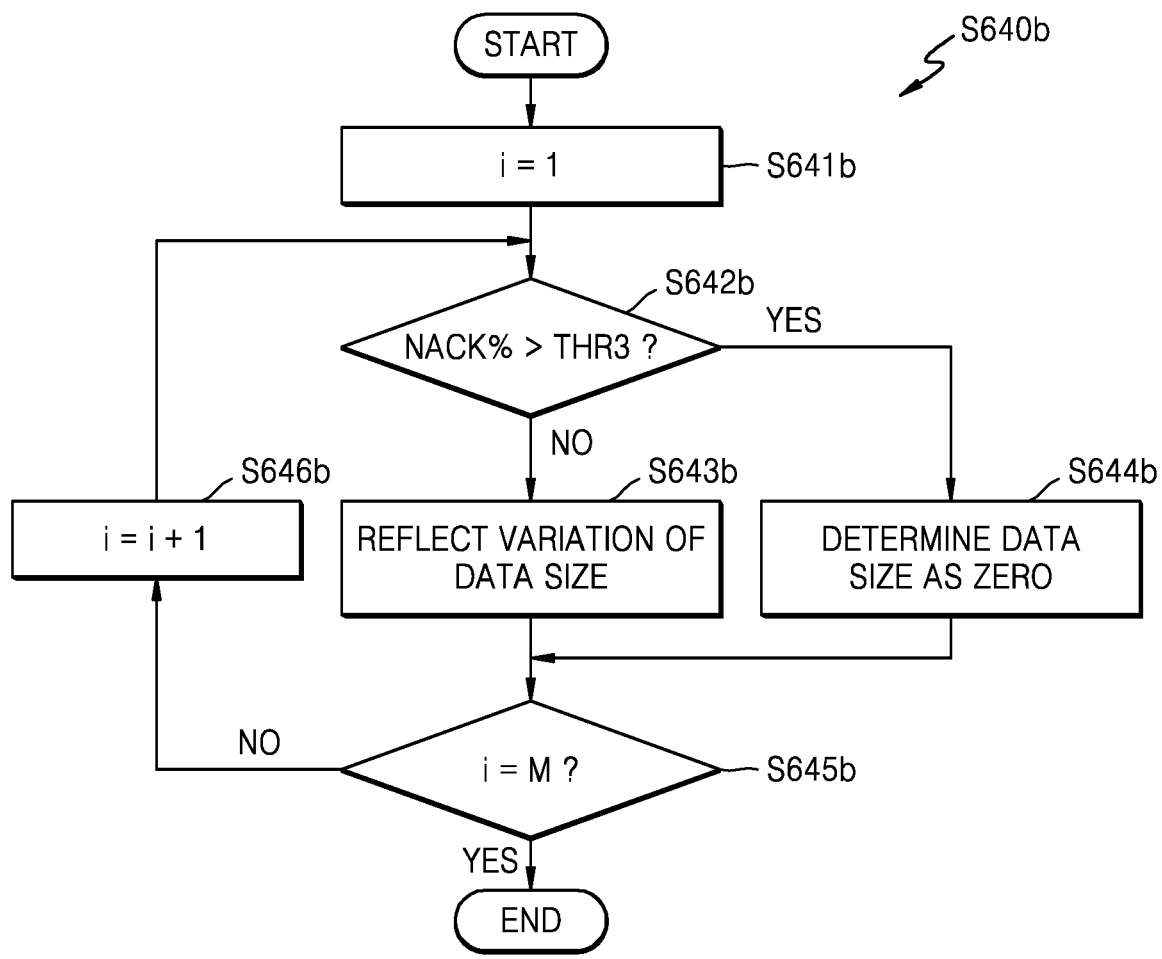

FIGS. 9A and 9B are flowcharts illustrating operation S640 of FIG. 8, according to exemplary embodiments. In detail, operation S640a of FIG. 9A and operation S640b of FIG. 9B may respectively include operations S644a and S644b of blocking transmission of data through a channel which has a poor channel state. As described below with reference to FIG. 8, an operation of changing data sizes may be performed in operation S640a of FIG. 9A and operation S640b of FIG. 9B. Hereinafter, repetitive descriptions will be omitted in describing FIGS. 9A and 9B, and FIGS. 9A and 9B will be described with reference to FIG. 3.

Referring to FIG. 9A, operation S640a may include operations S641a to S646a, and an initialization operation may be performed in operation S641a. For example, as illustrated in FIG. 9A, a variable i representing an index of a channel may be set to 1. In the embodiment of FIG. 9A, sizes of pieces of data which are to be transmitted through M number of channels may be determined, and thus, the variable i may have a value "1 to M".

In operation S642a, an operation of comparing a block error rate $BLER_i$ of an $i^{th}$ channel with a predefined second threshold value THR2 may be performed. As illustrated in FIG. 9A, when the block error rate $BLER_i$ of the $i^{th}$ channel is greater than the second threshold value THR2, operation S644a may be performed, and an operation of determining a data size as zero may be performed in operation S644a. On the other hand, when the block error rate $BLER_i$ of the $i^{th}$ channel is equal to or less than the second threshold value THR2, operation S643a may be performed, and an operation of reflecting a variation of data size in data distribution may be performed in operation S643a. As a result, when a block error rate BLER of a channel is high, the PDCP 34' may block transmission of data through a corresponding channel.

In operation S645a, an operation of comparing the variable i with M may be performed. As illustrated in FIG. 9A, when the variable i does not match M, namely, when the variable i is less than M, the variable i may increase by one in operation S646a, and operation S642a may be performed again. On the other hand, when the variable i matches M, namely, when data sizes corresponding to the M channels are all determined, operation S640a may end.

Referring to FIG. 9B, operation S640b may include operations S641b to S646b. Operations similar to the operations performed in some operations among operations S641a and S643a to S646a of operation S640a of FIG. 9A may be performed in some operations among operations S641b and S643b to S646b of FIG. 9B.

In operation S642b, an operation of comparing a predefined threshold value THR3 with a rate NACK % of a negative unacknowledge response (NACK) occurring in the $i^{th}$ channel may be performed. As illustrated in FIG. 9B, when the rate NACK % of NACK occurring in the $i^{th}$ channel is higher than the threshold value THR3, operation S644b may be performed, and when the rate NACK % of NACK occurring in the $i^{th}$ channel is equal to or lower than the threshold value THR3, operation S643b may be performed. As a result, when an NACK rate NACK % of a channel is high, the PDCP 34' may block transmission of data through a corresponding channel.

Figure 10:
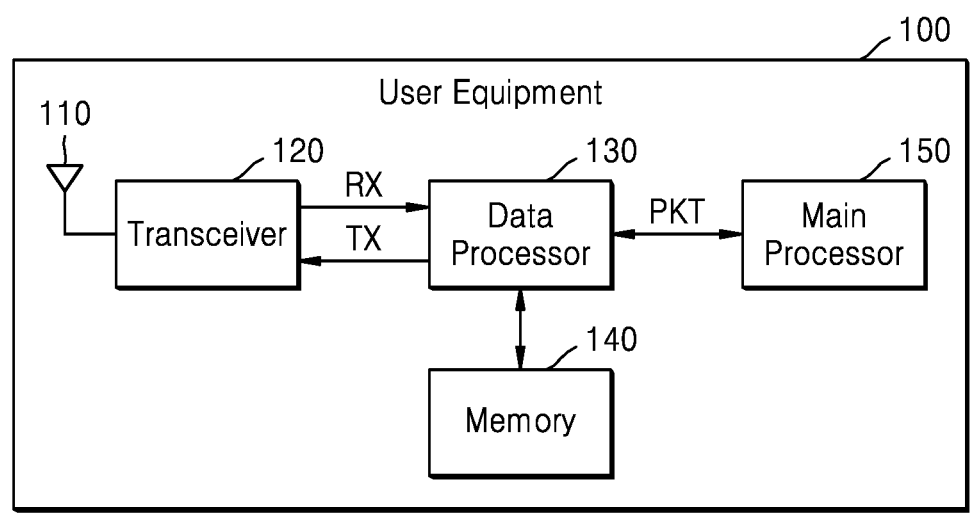
FIG. 10 is a block diagram illustrating user equipment according to an exemplary embodiment.

FIG. 10 is a block diagram illustrating UE 100 according to an exemplary embodiment. As described above with reference to FIG. 1, the UE 100 of FIG. 10 may support multi-connectivity and may perform wireless communication with two or more base stations. As illustrated in FIG. 10, the UE 100 may include an antenna 110, a transceiver 120, a data processor 130, a memory 140, and a main processor 150. The elements of the UE 100 are independently illustrated in FIG. 10, but in some embodiments, two or more elements may be implemented as one entity (for example, a semiconductor chip).

The antenna 110 may receive a radio frequency (RF) signal from a base station, or may transmit an RF signal to the base station. In some embodiments, the antenna 110 may be configured as an antenna array including a plurality of antennas and may support multiple input multiple output (MIMO) and beam forming.

The transceiver 120 may process a signal between the antenna 110 and the data processor 130. For example, the transceiver 120 may include a duplexer, a switch, a filter, a multiplexer, and an amplifier. Also, the transceiver 120 may process an RF signal received through the antenna 110 to generate a reception signal RX and may provide the reception signal RX to the data processor 130. Also, the transceiver 120 may process a transmission signal TX provided from the data processor 130 to generate an RF signal and may provide the generated RF signal to the antenna 110. In some embodiments, the transceiver 120 may be referred to as a radio frequency integrated circuit (RFIC).

The data processor 130 may process a data packet PKT received from the main processor 150 to generate the transmission signal TX, process the reception signal RX received from the transceiver 120 to generate the data packet PKT, and provide the generated data packet PKT to the main processor 150. The data processor 130 may perform an operation corresponding to at least one layer in a wireless protocol structure. For example, the data processor 130 may be referred to as a communication protocol and may perform functions of the first and second PHY layers 31a' and 31b', the first and second MACs 32a' and 32b', the first and second RLCs 33a' and 33b', and the PDCP 34' of FIG. 3. In some embodiments, the data processor 130 may include hardware including a logic block designed based on a logic combination, include a processing unit which includes software and at least one core (or at least one processor) for executing the software, and include a combination of the hardware and the processing unit. For example, the data processor 130 may include hardware blocks and/or software blocks respectively corresponding to the first and second PHY layers 31a' and 31b', the first and second MACs 32a' and 32b', the first and second RLCs 33a' and 33b', and the PDCP 34' of FIG. 3. The method according to exemplary embodiments described above with reference to the drawings and at least one operation included in the method may be performed by the data processor 130. In some embodiments, a base station (for example, 10 and/or 20 of FIG. 1) may have a structure similar to that of the UE 100 of FIG. 10, and a data processor included in the base station may perform a method for dual connectivity and at least one operation included in the method.

The memory 140 may store data needed for a process of processing, by the data processor 130, a signal and/or data. In some embodiments, the memory 140 may store software (i.e., a series of instructions) executed by the data processor 130.

The main processor 150 may include at least one core (or a processor). Also, the main processor 150 may transfer the data packet PKT, which is to be transmitted through wireless communication, to the data processor 130 and may receive data transmitted from the base station, based on the data packet PKT provided from the data processor 130. The main processor 150 may control an operation of the UE 100 and may generate the data packet PKT or may perform an operation, based on a received data packet PKT.

Figure 11A:
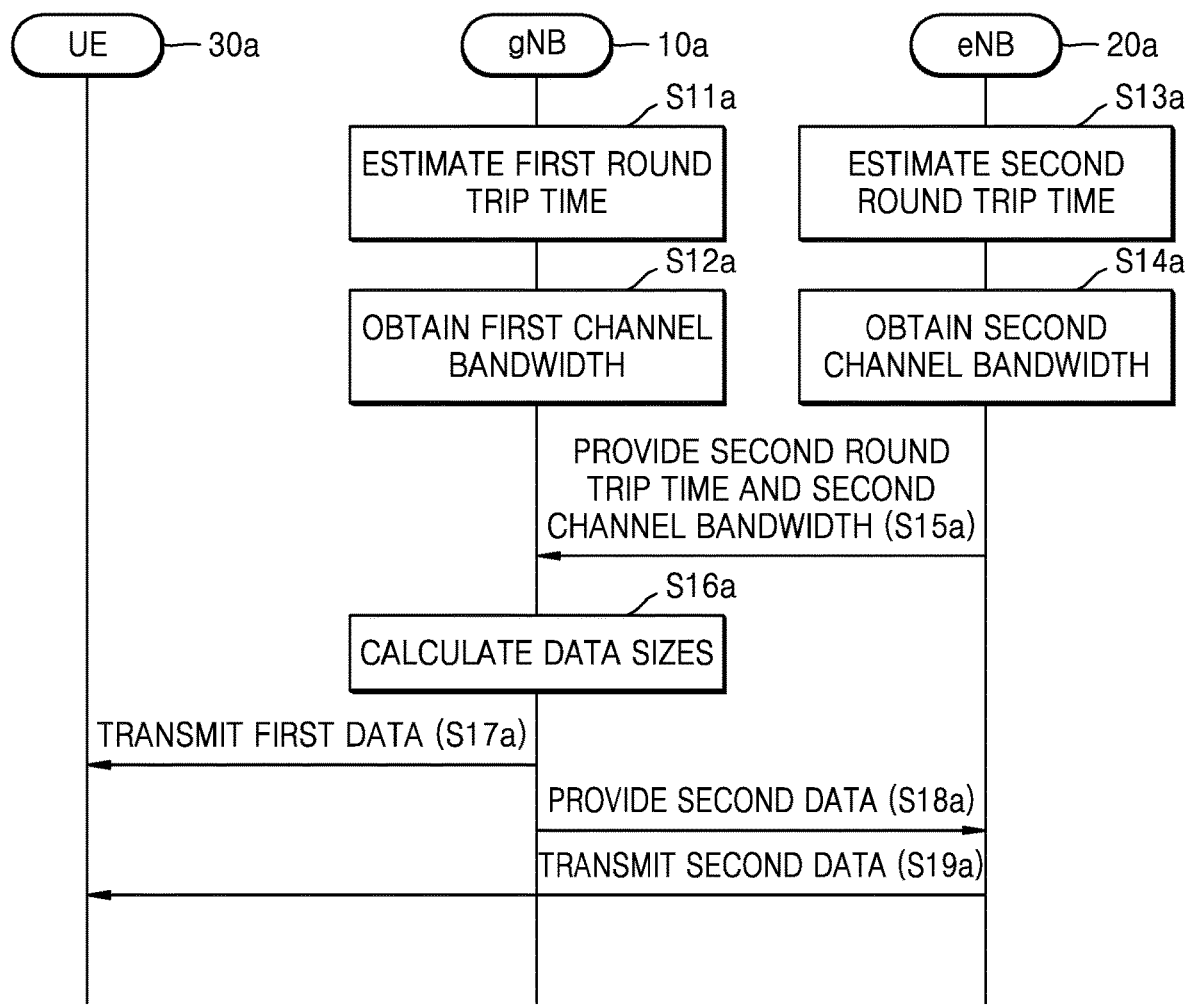
FIGS. 11A and 11B are diagrams illustrating a method for multi-connectivity with respect to time flow, according to exemplary embodiments.
Figure 11B:
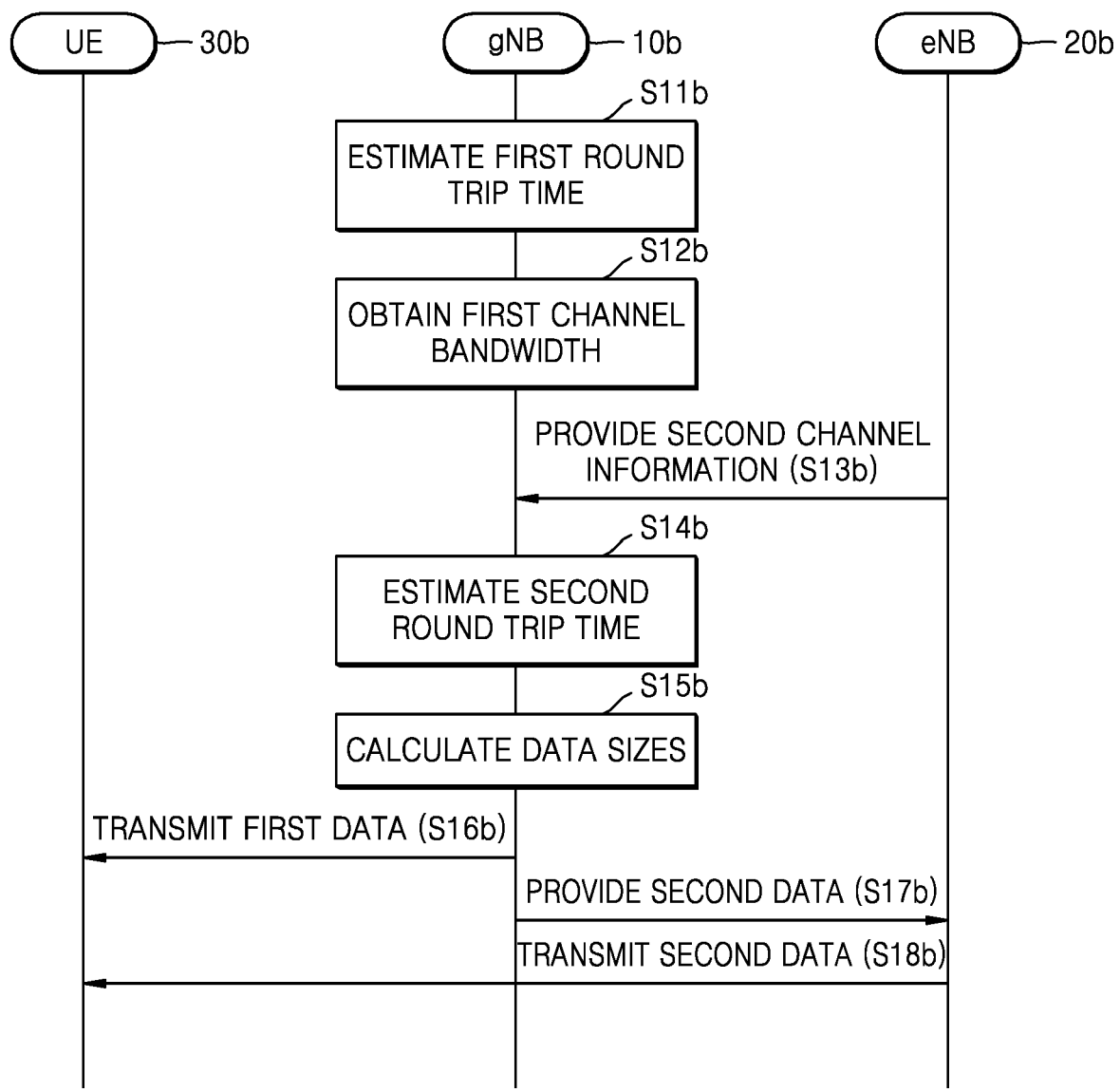

FIGS. 11A and 11B are diagrams illustrating a method for multi-connectivity with respect to time flow, according to exemplary embodiments. In detail, FIGS. 11A and 11B are diagrams illustrating examples of a method for multi-connectivity in the downlink. In some embodiments, one of the base stations connected to UE may perform splitting of data for multi-connectivity, and examples where first base stations 10a and 10b, which are base stations (for example, gNBs) of a 5G NR system, perform splitting of data for multi-connectivity will be described below with reference to FIGS. 11A and 11B. However, it should be understood that exemplary embodiments are not limited thereto. Hereinafter, FIGS. 11A and 11B will be described with reference to FIG. 1, and it may be assumed that the first base station 10, the second base station 20, and the UE 30 of FIG. 1 correspond to the first base station 10a, the second base station 20a, and the UE 30a of FIG. 11A and correspond to the first base station 10b, the second base station 20b, and the UE 30b of FIG. 11B. Repetitive descriptions will be omitted in describing FIGS. 11A and 11B.

Referring to FIG. 11A, a second round trip time $RTT_2$ corresponding to the second channel CH2 may be estimated by the second base station 20a which establishes the second channel CH2 with the UE 30a, and the estimated second round trip time $RTT_2$ may be provided from the second base station 20a to the first base station 10a.

In operation S11a, the first base station 10a may estimate a first round trip time $RTT_1$. The first base station 10a may establish the first channel CH1 with the UE 30a, and thus, as described above with reference to the drawings, the first base station 10a may estimate the first round trip time $RTT_1$ in a manner similar to a manner of estimating, by the UE 30a, the first round trip time $RTT_1$. Also, in operation S12a, the first base station 10a may obtain a first channel bandwidth $BW_1$.

In operation S13a, the second base station 20a may estimate the second round trip time $RTT_2$. The second base station 20a may establish the second channel CH2 with the UE 30a, and thus, as described above with reference to the drawings, the second base station 20a may estimate the second round trip time $RTT_2$ in a manner similar to a manner of estimating, by the UE 30a, the second round trip time $RTT_2$. Also, in operation S14a, the second base station 20a may obtain a second channel bandwidth $BW_2$.

In operation S15a, the second base station 20a may provide the second round trip time $RTT_2$ and the second channel bandwidth $BW_2$ to the first base station 10a. For example, as described above with reference to FIG. 1, the second base station 20a may provide the second round trip time $RTT_2$ and the second channel bandwidth $BW_2$ to the first base station 10a through the interface IF.

In operation S16a, the first base station 10a may calculate data sizes. For example, the first base station 10a may collect information about the first and second channels CH1 and CH2 in operations S11a to S15a and may calculate a variation $\Delta w$ of data size as in Equation (3), based on the collected information. The first base station 10a may reflect the variation $\Delta w$ of data size in calculating a size of first data which is to be transmitted from the first base station 10a to the UE 30a and a size of second data which is to be transmitted from the second base station 20a to the UE 30a.

In operation S17a, the first base station 10a may transmit the first data to the UE 30a through the first channel CH1, based on the calculated size of the first data. Also, in operation S18a, the first base station 10a may provide the second data to the second base station 20a. In operation S19a, the second base station 20a may transmit the second data, provided from the first base station 10a, to the UE 30a through the second channel CH2.

Referring to FIG. 11B, a second base station 20b which establishes the second channel CH2 with UE 30b may provide a first base station 10b with information about the second channel CH2, and the first base station 10b may estimate a second round trip time $RTT_2$, based on the information about the second channel CH2.

In operation S11b, the first base station 10b may estimate a first round trip time $RTT_1$, and in operation S12b, the first base station 10b may obtain a first channel bandwidth $BW_1$.

In operation S13b, the second base station 20b may provide second channel information to the first base station 10b. For example, as described above with reference to the drawings, the second base station 20b may provide the first base station 10b with information (for example, second retransmission parameters corresponding to the second channel CH2) used to estimate the second round trip time $RTT_2$ and information (for example, second channel information including a second channel bandwidth $BW_2$) used to calculate a variation $\Delta w$ of data size. In some embodiments, the second base station 20b may provide the first base station 10b with propagation delay (i.e., second propagation delay $p_2$) corresponding to the second channel CH2.

In operation S14b, the first base station 10b may estimate the second round trip time $RTT_2$. For example, the first base station 10b may estimate the second round trip time $RTT_2$ by using Equation (5), Equation (6), and/or Equation (7), based on the second channel information which is provided in operation S13b.

In operation S15b, the first base station 10b may calculate data sizes. In operation S16b, the first base station 10b may transmit first data to the UE 30b through the first channel CH1, based on a calculated size of the first data. Also, in operation S17b, the first base station 10b may provide second data to the second base station 20b. In operation S18b, the second base station 20b may transmit the second data, provided from the first base station 10b, to the UE 30b through the second channel CH2.

Figure 12:
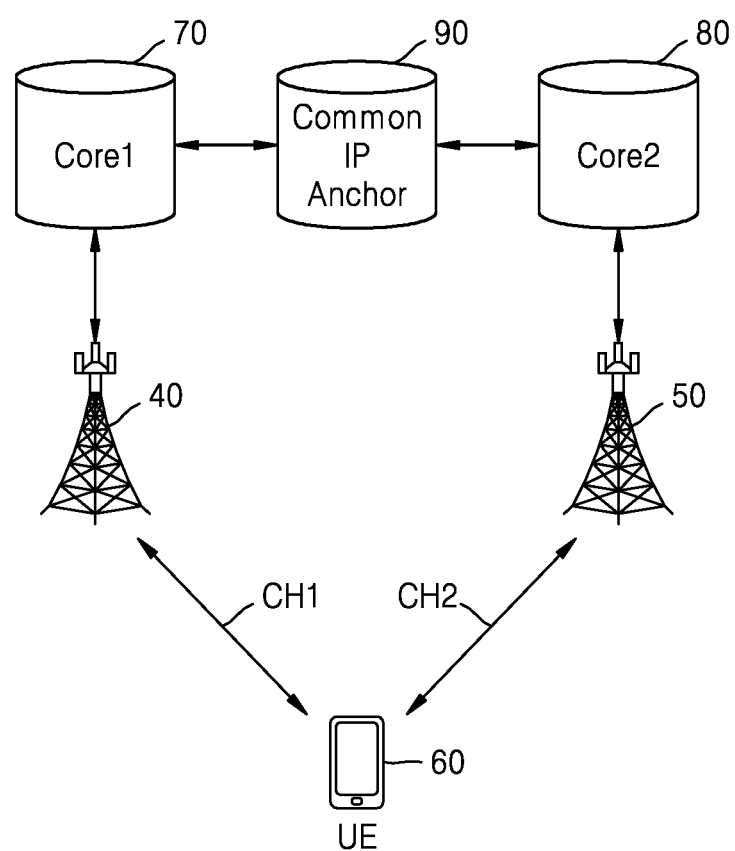
FIG. 12 is a diagram illustrating multi-connectivity according to an exemplary embodiment.

FIG. 12 is a diagram illustrating multi-connectivity according to an exemplary embodiment. In detail, FIG. 12 illustrates a structure including cores (for example, a first core and a second core) 70 and 80 connected to base stations (for example, a first base station and a second base station) 40 and 50. Hereinafter, in describing FIG. 12, description overlapping FIG. 1 will be described.

Referring to FIG. 12, UE 60 may access the first base station 40 through a first channel CH1 and may access the second base station 50 through a second channel CH2. The first base station 40 may access the first core 70, and the second base station 50 may access the second core 80. For example, the first base station 40 may be a base station of the 5G NR system, and the second base station 50 may be a base station of the LTE system. In this case, the second core 80 may be referred to as an evolved packet core (EPC).

The first core 70 and the second core 80 may access a common Internet protocol (IP) anchor 90, and the common IP anchor 90 may be a network entity and may perform a function of routing data transferred from a data network to one UE 60. In some embodiments, the common IP anchor 90 may perform splitting of data in multi-connectivity, and relevant embodiments will be described below with reference to FIGS. 13A and 13B.

Figure 13A:
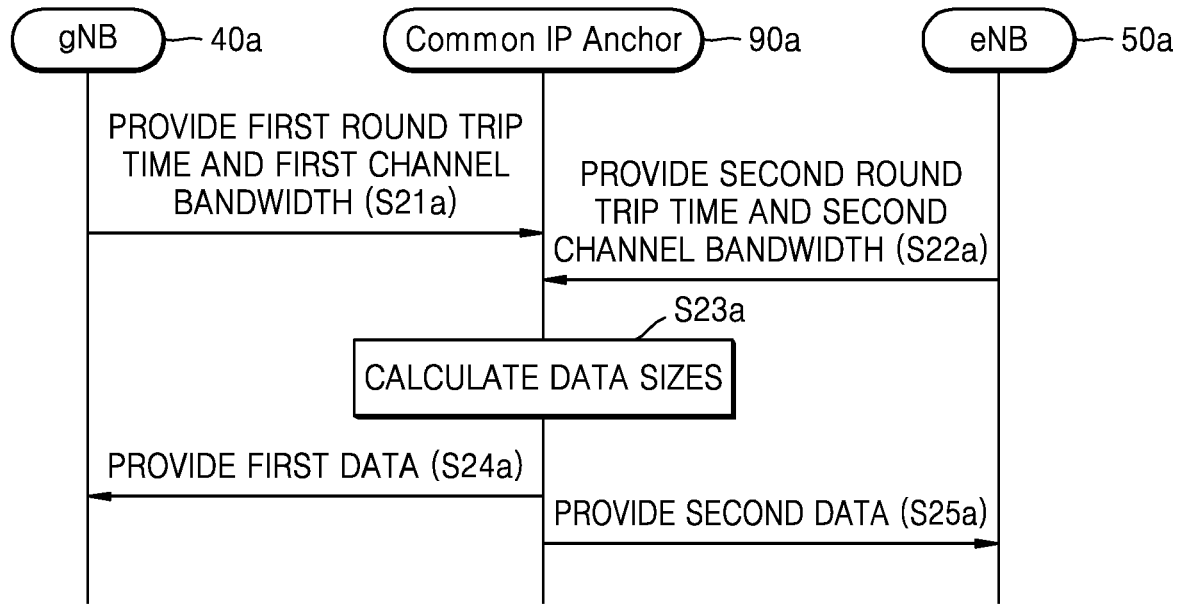
FIGS. 13A and 13B are diagrams illustrating a method for multi-connectivity with respect to time flow, according to exemplary embodiments.
Figure 13B:
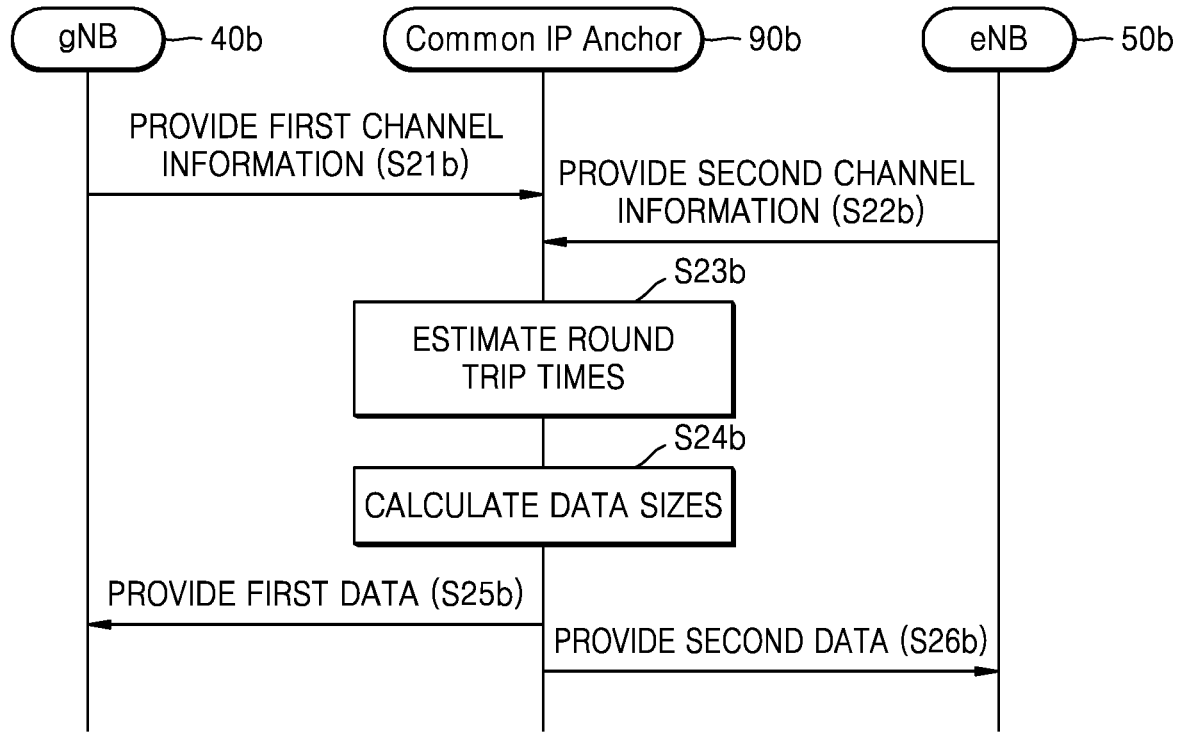

FIGS. 13A and 13B are diagrams illustrating a method for multi-connectivity with respect to time flow, according to exemplary embodiments. In detail, FIGS. 13A and 13B illustrate examples of a method for multi-connectivity in the downlink. In some embodiments, common IP anchors 90a and 90b may perform splitting of data for multi-connectivity, and examples where data is distributed to first base stations 40a and 40b of the 5G NR system and second base stations 50a and 50b of the LTE system will be described below with reference to FIGS. 13A and 13B. However, it should be understood that exemplary embodiments are not limited thereto.

Referring to FIG. 13A, the common IP anchor 90a may split data, based on round trip times and channel bandwidths provided from the first base station 40a and the second base station 50a. In operation S21a, the first base station 40a may provide the common IP anchor 90a with a first round trip time $RTT_1$ and a first channel bandwidth $BW_1$ each corresponding to a first channel CH1. In operation S22a, the second base station 50a may provide the common IP anchor 90a with a second round trip time $RTT_2$ and a second channel bandwidth $BW_2$ each corresponding to a second channel CH2. For example, the first base station 40a and the second base station 50a may respectively calculate the first round trip time $RTT_1$ and the second round trip time $RTT_2$, based on Equation (5), Equation (6), and/or Equation (7).

In operation S23a, the common IP anchor 90a may calculate sizes of pieces of split data, based on the round trip times and the channel bandwidths provided from the first base station 40a and the second base station 50a. For example, the common IP anchor 90a may calculate a variation $\Delta w$ of data size, based on Equation (3) and may reflect the variation $\Delta w$ of data size in calculating a size of first data which is to be transmitted through the first channel CH1 and a size of second data which is to be transmitted through the second channel CH2. Subsequently, in operation S24a, the common IP anchor 90a may provide the first data to the first base station 40a, and in operation S25a, the common IP anchor 90a may provide the second data to the second base station 50a.

Referring to FIG. 13B, the common IP anchor 90b may split data, based on channel information provided from each of the first base station 40b and the second base station 50b. In operation S21b, the first base station 40b may provide the common IP anchor 90b with first channel information corresponding to a first channel CH1. In operation S22b, the second base station 50b may provide the common IP anchor 90b with second channel information corresponding to a second channel CH2. For example, the first channel information may include first retransmission parameters and a first channel bandwidth, and the second channel information may include second retransmission parameters and a second channel bandwidth.

In operation S23b, the common IP anchor 90b may estimate round trip times. For example, the common IP anchor 90b may estimate the first round trip time $RTT_1$ and the second round trip time $RTT_2$ by using Equation (5), Equation (6), and/or Equation (7), based on the first channel information and the second channel information. In operation S24b, the common IP anchor 90b may calculate sizes of pieces of split data. For example, the common IP anchor 90b may calculate a variation $\Delta w$ of data size, based on Equation (3) and may reflect the variation $\Delta w$ of data size in calculating a size of first data which is to be transmitted through the first channel CH1 and a size of second data which is to be transmitted through the second channel CH2. In operation S25b, the common IP anchor 90b may provide the first data to the first base station 40b, and in operation S26b, the common IP anchor 90b may provide the second data to the second base station 50b.

While the inventive concept has been particularly shown and described with reference to embodiments thereof, it will be understood that various changes in form and details may be made therein without departing from the spirit and scope of the following claims.

What is claimed is:

1. A method for multi-connectivity between a plurality of base stations and user equipment through a plurality of channels, the method comprising:

estimating a first round trip time (RTT) at the user equipment, wherein the first RTT is expected time to be taken for transmitting data and receiving an acknowledge (ACK) through a first channel;

estimating, a second RTT at the user equipment, wherein the second RTT is expected time to be taken for transmitting data and receiving an ACK through a second channel;

determining, at the user equipment, a size of uplink data which is to be transmitted through the first channel, by using both the first RTT and the second RTT;

obtaining a first channel bandwidth corresponding to the first channel; and obtaining a second channel bandwidth corresponding to the second channel, wherein the determining the size of the uplink data comprises obtaining the size of the uplink data, by using both the first RTT, the second RTT, and the first channel bandwidth and the second channel bandwidth, wherein the determining the size of the uplink data comprises changing the size of the uplink data, based on a variation $\Delta w$, which is expressed in an equation below:

$$\Delta w = \frac{\max\left(\frac{BW_1}{RTT_1}, \frac{BW_2}{RTT_2}\right)}{(BW_1 + BW_2)^2},$$

and wherein the $RTT_1$, the $RTT_2$, the $BW_1$, and the $BW_2$ are the first RTT, the second RTT, the first channel bandwidth, and the second channel bandwidth, respectively.

2. The method of claim 1, wherein the estimating the first RTT comprises:
obtaining retransmission parameters corresponding to the first channel; and
obtaining the first RTT, based on the retransmission parameters.

3. The method of claim 2, wherein
the retransmission parameters comprise a retransmission period $c_1$ and a maximum retransmission number $N_1$, and
the obtaining the first RTT comprises obtaining an $RTT_{S1}$, which is expressed in an equation below:

$RTT_{S1} = (1 - BLER \times \Sigma_{n=0}^{N_1-1} BLER_1^n (p_1 + n \times c_1))$, wherein the $BLER_1$ and the $p_1$ are a block error rate and a signal moving time in the first channel, respectively.

4. The method of claim 3, wherein
the retransmission parameters further comprise a maximum retransmission number $R_1$ of a radio link control (RLC) entity, and
the obtaining the first RTT comprises obtaining, as the first RTT, an $RTT_{T1}$, which is expressed in an equation below:

$RTT_{T1} = RTT_{S1} \times \Sigma_{r=0}^{R1} (BLER_1^{N1})^r$.

5. The method of claim 3, wherein the obtaining the first RTT comprises determining the $RTT_{S1}$ as the first RTT in response to the $BLER_1$ being less than a first threshold value.

6. The method of claim 3, wherein the determining the size of the uplink data comprises determining the size of the uplink data as zero in response to the $BLER_1$ being greater than a second threshold value.

7. The method of claim 2, wherein
the obtaining the retransmission parameters comprises obtaining updated retransmission parameters corresponding to the first channel, and
the obtaining the first RTT comprises obtaining the first RTT based on the updated retransmission parameters.

8. The method of claim 1, wherein the method is performed in a packet data convergence protocol (PDCP) layer.

9. The method of claim 1, wherein the determining the size of the uplink data comprises determining the size of the uplink data as zero in response to a rate of negative unacknowledge response (NACK) through the first channel being greater than a third threshold value.

10. The method of claim 1, further comprising determining a size of uplink data which is to be transmitted through the second channel, by using both the first RTT and the second RTT.

11. The method of claim 1, wherein
the user equipment communicates with a first base station through the first channel and a second base station through the second channel, and
the first base station and the second base station communicate with the user equipment, based on a same radio access technology.

12. The method of claim 1, wherein
the user equipment communicates with a first base station through the first channel and a second base station through the second channel, and
the first base station and the second base station communicate with the user equipment, based on different radio access technologies.

13. A method for multi-connectivity between a plurality of base stations and a user equipment through a plurality of channels, the method comprising:
estimating a first round trip time (RTT) at a first base station, wherein the first RTT is expected time to be taken for transmitting data and receiving an acknowledge (ACK) through a first channel;
obtaining a second RTT at the first base station, wherein the second RTT is expected time to be taken for transmitting data and receiving an ACK through a second channel;
determining, at the first base station, a size of downlink data which is to be transmitted from the first base station to the user equipment, by using both the first RTT and the second RTT;
obtaining a first channel bandwidth corresponding to the first channel; and
obtaining a second channel bandwidth corresponding to the second channel,
wherein the determining the size of the downlink data comprises obtaining the size of the downlink data, by using both the first RTT, the second RTT, and the first channel bandwidth and the second channel bandwidth,
wherein the determining the size of the downlink data comprises changing the size of the downlink data, based on a variation $\Delta w$, which is expressed in an equation below:

$$\Delta w = \frac{\max\left(\frac{BW_1}{RTT_1}, \frac{BW_2}{RTT_2}\right)}{(BW_1 + BW_2)^2} * N_{ACK1},$$

and wherein the $RTT_1$, the $RTT_2$, the $BW_1$, the $BW_2$, and the $N_{ACK1}$ are the first RTT, the second RTT, the first channel bandwidth, the second channel bandwidth, and a number of acknowledge responses (ACKs) received through the first channel, respectively.

14. The method of claim 13, wherein the obtaining the second RTT comprises receiving the second RTT, estimated by a second base station, from the second base station.

15. The method of claim 13, wherein the obtaining the second RTT comprises:
receiving channel information about the second channel from a second base station; and
estimating the second RTT, based on the channel information.

16. A method for multi-connectivity between a plurality of base stations and a user equipment through a plurality of channels, the method comprising:

estimating a first round trip time (RTT) at the user equipment, wherein the first RTT is expected time to be taken for transmitting data and receiving an acknowledgement (ACK) through a first channel;

estimating a second RTT at the user equipment, wherein the second RTT is expected time to be taken for transmitting data and receiving an ACK through a second channel;

obtaining channel bandwidths of the first channel and the second channel; and determining, at the user equipment, a size of uplink data to be transmitted through the first channel, by using both the first RTT and the second RTT, and the channel bandwidths of the first channel and the second channel, wherein the determining the size of the uplink data comprises changing the size of the uplink data, based on a variation $\Delta w$, which is expressed in an equation below:

$$\Delta w_i = \frac{\max_{1 \le i \le M} \frac{BW_i}{RTT_i}}{\left(\sum_{i=1}^{M} BW_i\right)^2},$$

and wherein the $RTT_1$, the $RTT_2$, the $BW_1$, and the $BW_2$ are the first RTT, the second RTT, the channel bandwidth of the first channel, and the channel bandwidth of the second channel, respectively.

* * * * *